US008827071B2

(12) United States Patent
van de Loecht

(10) Patent No.: US 8,827,071 B2
(45) Date of Patent: Sep. 9, 2014

(54) TRANSPORTING APPARATUS WITH ARTICULATED CONVEYING ELEMENT

(75) Inventor: Heinrich van de Loecht, Muggensturm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/579,854

(22) PCT Filed: Feb. 18, 2011

(86) PCT No.: PCT/EP2011/052385
§ 371 (c)(1),
(2), (4) Date: Aug. 17, 2012

(87) PCT Pub. No.: WO2011/131385
PCT Pub. Date: Oct. 27, 2011

(65) Prior Publication Data
US 2013/0026011 A1  Jan. 31, 2013

(30) Foreign Application Priority Data
Apr. 19, 2010  (DE) .......................... 10 2010 027 925

(51) Int. Cl.
*B65G 21/22* (2006.01)
*B65G 54/02* (2006.01)
*B65G 17/06* (2006.01)
*B65G 17/24* (2006.01)
*B65G 17/12* (2006.01)
*B65G 39/20* (2006.01)
*B65G 17/38* (2006.01)

(52) U.S. Cl.
CPC ................ *B65G 54/02* (2013.01); *B65G 17/06* (2013.01); *B65G 21/22* (2013.01); *B65G 17/24* (2013.01); *B65G 17/12* (2013.01); *B65G 39/20* (2013.01); *B65G 17/38* (2013.01)
USPC ........... 198/805; 198/619; 198/845; 198/850; 198/852; 198/800

(58) Field of Classification Search
CPC .... B65G 17/002; B65G 17/005; B65G 17/06; B65G 17/12; B65G 17/16; B65G 17/18; B65G 17/24; B65G 17/38; B65G 35/06; B65G 21/22; B65G 23/02; B65G 39/20
USPC ........... 198/370.03, 465.1, 469.1, 473.1, 619, 198/620, 728, 725, 729, 793, 800, 805, 838, 198/845, 850, 851, 852
See application file for complete search history.

(56) References Cited

U.S. PATENT DOCUMENTS 3,792,665 A    2/1974  Nelson
4,841,869 A    6/1989  Takeuchi et al.
(Continued)

FOREIGN PATENT DOCUMENTS

DE    1638974    4/1970
DE    4190246    3/1992
(Continued)

OTHER PUBLICATIONS

PCT/EP2011/052385 International Search Report dated May 27, 2011 (Translation and Original, 6 pages).

*Primary Examiner* — Leslie A Nicholson, III
(74) *Attorney, Agent, or Firm* — Michael Best & Friedrich LLP

(57) ABSTRACT

The invention relates to a transporting apparatus for conveying a product, comprising a movable conveying element (2) for conveying the product, also comprising a fixed-location running rail (3), which is arranged all the way round and defines a running track for the conveying element (2), and further comprising a linear-motor-drive means (4) for driving the conveying element (2), wherein the conveying element (2) has a permanent magnet (5) which is in operative connection with coils (6) of the linear-motor-drive means (4), and wherein the conveying element (2) has at least a first sub-element (22) and a second sub-element (23), which are connected to one another in an articulated manner by means of an articulation (7).

20 Claims, 5 Drawing Sheets

(56) References Cited

U.S. PATENT DOCUMENTS

| | | | |
|---|---|---|---|
| 5,103,963 A * | 4/1992 | Sticht | 198/465.1 |
| 5,225,725 A | 7/1993 | Shiraki et al. | |
| 5,454,328 A | 10/1995 | Matsuzaki et al. | |
| 6,536,583 B2 * | 3/2003 | Luigi | 198/832 |
| 6,876,107 B2 * | 4/2005 | Jacobs | 310/12.19 |
| 6,876,896 B1 | 4/2005 | Ortiz et al. | |
| 7,275,897 B2 * | 10/2007 | Reguzzi | 408/35 |
| 7,401,696 B2 * | 7/2008 | Miyanishi et al. | 198/778 |
| 7,422,099 B2 * | 9/2008 | Reguzzi | 198/805 |
| 8,096,409 B2 * | 1/2012 | Wipf et al. | 198/805 |
| 2003/0136086 A1 | 7/2003 | Kalany et al. | |
| 2003/0230941 A1 | 12/2003 | Jacobs | |
| 2005/0029877 A1 | 2/2005 | Harned et al. | |
| 2007/0023260 A1 | 2/2007 | Reguzzi | |
| 2010/0084247 A1 | 4/2010 | Wipf et al. | |
| 2012/0018282 A1 | 1/2012 | Loecht | |

FOREIGN PATENT DOCUMENTS

| | | |
|---|---|---|
| DE | 4311863 | 8/1994 |
| DE | 102007054730 | 5/2009 |
| EP | 0043399 | 1/1982 |
| EP | 0820862 | 1/1998 |
| EP | 1123886 | 8/2001 |
| EP | 1714923 | 10/2006 |
| GB | 191109573 | 3/1912 |
| GB | 1350715 | 4/1974 |
| WO | 2010005300 | 1/2010 |
| WO | 2010108509 | 9/2010 |

* cited by examiner

TRANSPORTING APPARATUS WITH ARTICULATED CONVEYING ELEMENT

BACKGROUND OF THE INVENTION

The present invention relates to a transporting apparatus with an articulated conveying element, in particular for conveying products for charging packaging machines.

Various developments of transport systems for conveying products, in particular for use in packaging machines, are known from the prior art. These types of transport systems are known, for example, from U.S. Pat. No. 6,876,896 B1 and U.S. Pat. No. 5,225,725 B1. The transport systems, in this case, are to have as compact a design as possible, attempts being made to design the fixed, peripheral running rail, in particular in the curved region, with as small a radius as possible. In order, in this case, however, to keep the air gap between the curved primary part and the permanent magnets, which are located on a flat iron counter plate on the rigid conveying element, approximately constant, certain boundaries are placed on the radii such that the known transport systems take on a relatively large radius of curvature and require a correspondingly large space for installation. In addition, in particular in the curved region there is increased wear caused by the slip movement of the running rollers, which shortens the maintenance intervals for the transport systems.

SUMMARY OF THE INVENTION

In contrast, the advantage of the transporting apparatus for conveying products is that, in particular through the possibility of reducing the radii in the curved regions with a constant air gap between the curved primary parts and the permanent magnets, the design of said transporting apparatus is very compact and takes up little space. This is achieved in that the transporting apparatus comprises transporting elements which have at least one first part element and one second part element, said part elements being connected to one another in an articulated manner by means of an articulation. This means that smaller curve radii are made possible, which results in the above-mentioned saving on installation space. In addition, the articulated conveying elements make it possible for the carrying capacity of the conveying elements to be able to be increased in a significant manner by the relatively large number of running rollers and a larger spacing between the running rollers of the conveying elements. A further advantage of the conveying is that play-free guiding of the conveying elements is also possible in curved regions of the conveying section or at the transition between linear regions and curved regions. In addition, changes in the linear overlap between coils, which are arranged in the conveying section, and permanent magnets, which are arranged on the conveying element and form a linear motor driving device, can be achieved by means of the articulated conveying elements. This means that feeding power losses are avoided and in addition the electromagnet feeding power is not restricted in the case of small turning radii. Direct power flow in the conveying direction is possible without additional torque load such that the conveying elements can circulate at high dynamics. A further big advantage is that conveying elements can now be constructed in a modular manner, it being possible simply to add or leave out individual part elements. This means that there is increased variability in the transport system and the possibility of a modular system for different applications and customers.

In a particularly preferred manner, one running roller is arranged in each case on each part element of a conveying element. This achieves particularly stable and smooth running of the conveying elements. In addition, the running rollers always remain in contact with the rail even in the curved region as a result of the flexibility of the conveying element.

In a further preferred manner, at least one of the running rollers is arranged on an articulated axis between two part elements. This means that an axis of the running roller and the articulated axis are located in a common axis, as a result of which the flexibility of the guide element is increased in a significant manner.

The transporting apparatus comprises a guide device with a guide rail on the running rail and at least one guide element on the conveying element, in particular a guide roller. This means that it is possible to realize secure guiding of the conveying elements. In a particularly preferred manner, the conveying element comprises at least three guide elements, wherein one guide element is arranged on a first side of the guide rail and two guide elements are arranged on a second side of the guide rail for secure guiding.

For as stable a running behavior as possible, each conveying element has at least one first running wheel group and one second running wheel group. The two running wheel groups, in this case, are arranged on a first or second side of the guide element and give the conveying element the necessary stability.

In a further preferred manner, the conveying element comprises a contact element, in particular a protruding pusher finger, for contact with the products to be conveyed, said pusher finger preferably being arranged so as to be interchangeable. Consequently, the product can be conveyed simply and securely and the contact element can be adapted to different products in a simple manner, for example by replacement.

A particularly smooth and stable running behavior is produced when the conveying element preferably has precisely three or precisely five part elements. Precisely three part elements are preferred in particular as a result of the short axial installed length in the conveying direction.

Particularly secure guiding of the conveying element is produced when at least one guide element, in particular a guide roller, is arranged on each of the part elements. The guiding is preferably realized as center guiding.

The permanent magnets on the conveying element are preferably realized in a cuboid shape. In this case, the permanent magnet is preferably arranged in such a manner that an articulated axis of the articulation and a corner of the permanent magnet are located on a straight line, i.e. the articulation axis runs precisely in the center between the pairs of permanent magnets. This means that an inadmissibly large change in the spacing between the permanent magnets and the coils which are arranged in the running rail is able to be avoided in the curved region of the transporting apparatus.

In a further preferred manner, the running rollers of the conveying elements are provided with a plastics material running surface and are realized in a spherical manner. This means that there is no need to lubricate the running rollers and the running rollers are in particular insensitive in relation to contaminants on the running rail, if such are present.

BRIEF DESCRIPTION OF THE DRAWINGS

Preferred exemplary embodiments of the invention are described in detail below with reference to the accompanying drawing, in which.

DETAILED DESCRIPTION

A transporting apparatus 1 according to a first preferred exemplary embodiment of the invention is described in detail below with reference to FIGS. 1 to 5.

Figure 1:
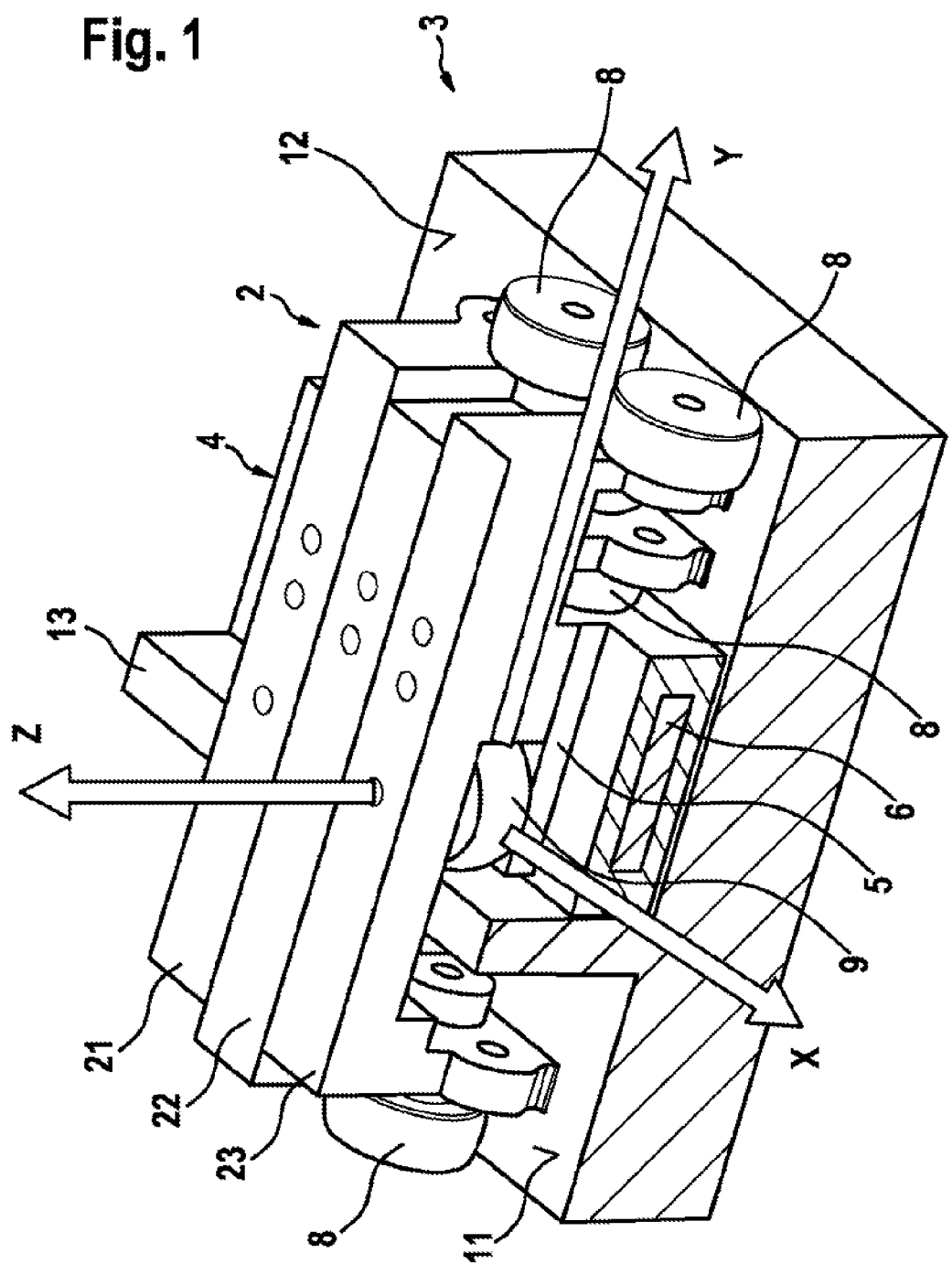
FIG. 1 shows a schematic, perspective view of a conveying element on a running rail according to a first exemplary embodiment of the invention.
Figure 2:
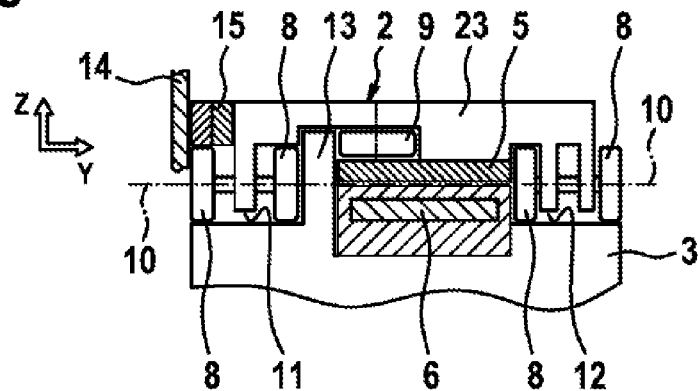
FIG. 2 shows a schematic front view of the conveying element.

As can be seen from FIG. 1, the transporting apparatus 1 comprises a conveying element as well as a running rail 3, which is only shown in part in FIG. 1 and is provided in a fixed and peripheral manner. The running rail 3 has a design with linear part regions as well as curved regions such that in total an oval-shaped section is produced. In addition, it is also possible to have other forms of running tracks, e.g. shaped in an angular manner, which are assembled from modular linear and curved elements. The running rail 3 comprises a first running track 11, a second running track 12 and a guide rail 13 which is arranged between the two running tracks. In addition, there is provided a linear motor driving device 4, which comprises a plurality of coils 6 which are arranged in the running rail 3 and permanent magnets 5 which are arranged on the conveying element 2. This means that it is possible to realize a transporting apparatus with a plurality of conveying elements 2 which are driven independently of each other. In this case, an electromagnetic moving field is generated by means of the coils 6, the conveying elements 2 following the moving field by means of magnetic coupling and consequently being moved along the running rail.

Figure 3:
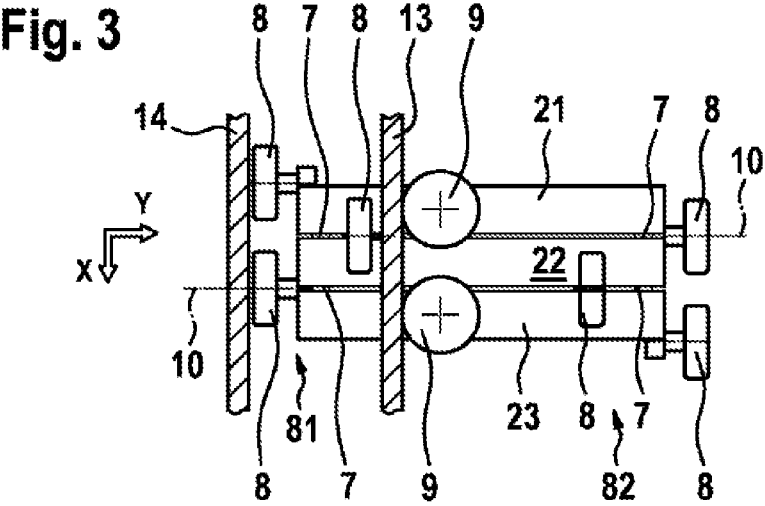
FIG. 3 shows a schematic top view of the conveying element.
Figure 5:
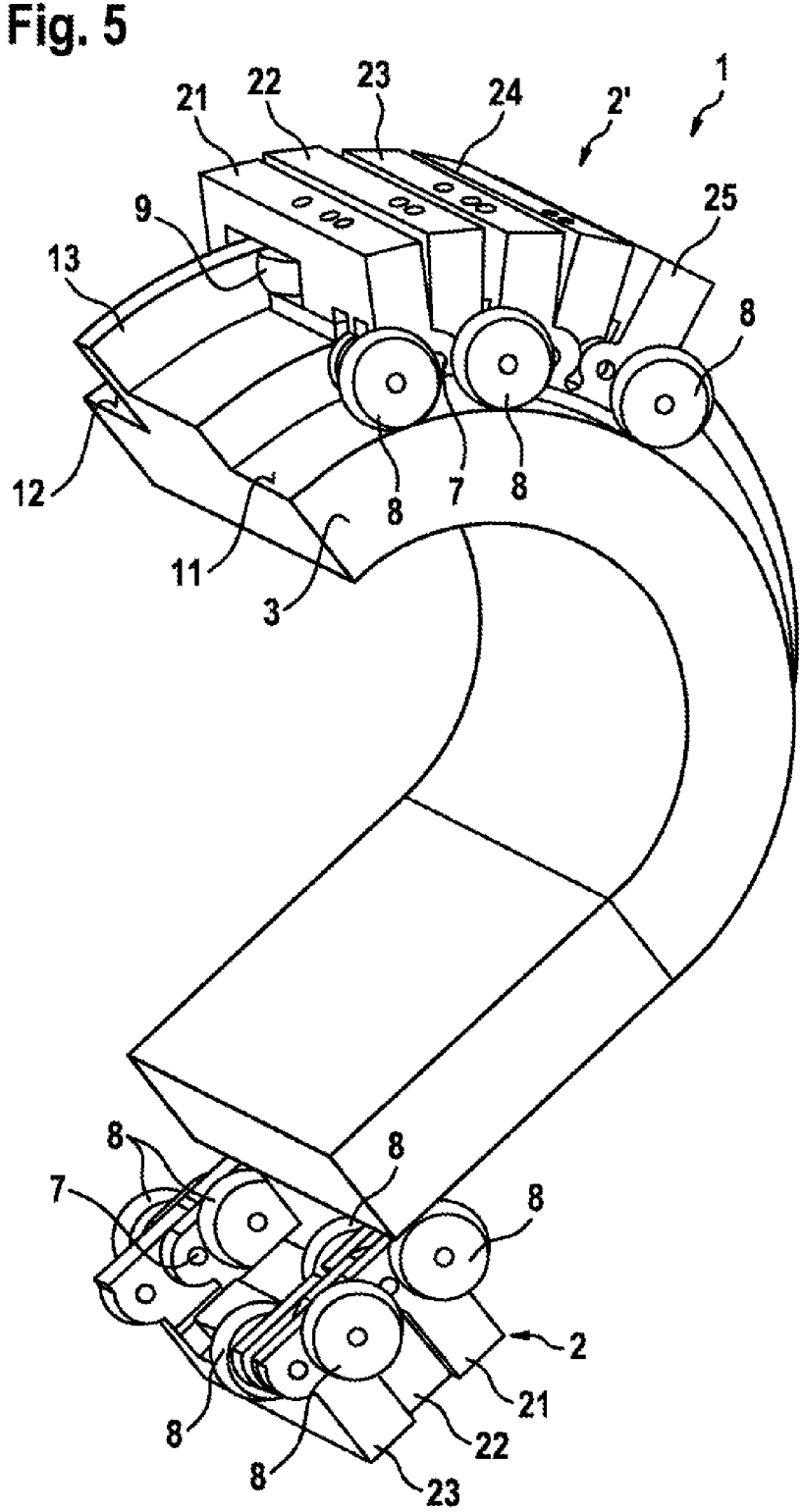
FIG. 5 shows a perspective representation of conveying elements cornering.

The conveying element 2, which can be seen in particular from FIG. 1, comprises a first part element 21, a second part element 22 and a third part element 23, adjacent part elements being connected to each other in an articulated manner in each case by means of an articulation 7 (see FIG. 3). In this case at least one running roller 8 or a permanent magnet is provided on each of the part elements 21, 22, 23. As can be seen from FIG. 3, in this case the running rollers 8 which are arranged on a first side of the guide rail 13 form a first running roller group 81 and the running rollers 8 which are arranged on a second side of the guide rail 13 form a second running wheel group 82. As can be seen from FIG. 1, the first running wheel group 81 runs on the first running track 11 and the second running roller group 82 runs on the second running track 12. As can also be seen from FIGS. 1, 2 and 3, two guide rollers 9 are arranged on the conveying elements 2, said guide rollers rotating on the second side of the guide rail 13 to guide the conveying element 2. As can be seen in particular from FIG. 3, articulated axes 10, on which the part elements are connected together in an articulated manner, are also the rotation axes of the running rollers 8. In this case, a maximum pivot angle of the part elements with respect to one another is restricted by the running rollers 8. As an alternative to this, stops which restrict the pivoting of adjacent part elements with respect to one another can also be provided in the part elements. On the upper surface of the conveying element 2, interfaces are provided in the individual part elements 21, 22, 23 in order to attach format parts such as, for example, a pusher finger. The individual part elements 21, 22, 23, in this case, have an identical basic design such that an arbitrary number of part elements are able to be connected together. In this exemplary embodiment, a three-member conveying element 2 is shown in FIG. 1. FIG. 5, in this case, also shows a five-member conveying element 2' along with the three-member conveying element 2.

A sensor board, which extends around the periphery and is in operative connection with a second permanent magnet 15 (cf. FIG. 2), is additionally provided laterally to the running rail 3 in order to determine an exact position of the conveying element 2 on the running rail 3.

Figure 4:
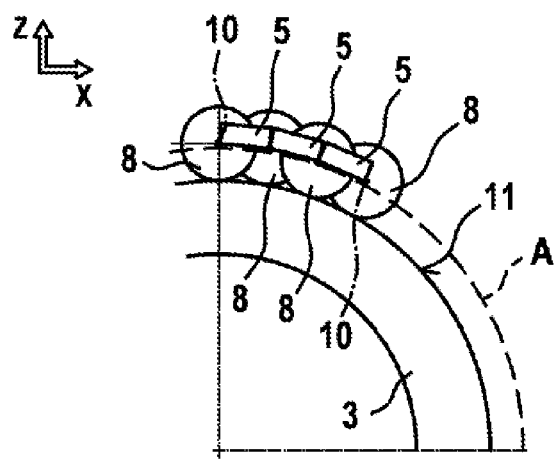
FIG. 4 shows a schematic representation of the conveying element cornering.

FIG. 4 shows the transition of the conveying element 2 from a linear running rail region to a curve in the running rail 3. It is possible to provide a small curve radius as a result of the articulated arrangement of the part elements 21, 22, 23. As indicated by the broken line A, in this case spacing between the permanent magnets 5 and the coils 6 which are arranged in rows remains constant even in the curved region. As can be seen from FIG. 4, in this case the articulated axes 10, which, at the same time, are also the axes of the running rollers 8, are arranged in the corner regions of the permanent magnets 5. The constant spacing can also be ensured in the curved region through this measure.

Consequently, it is possible to realize smaller curve radii by means of the articulated conveying element 2 such that the transporting apparatus 1 overall is designed to be much more compact than in the prior art. The conveying elements 2, in this case, can be designed in a very compact manner. In particular, in this case, turning radii of 100 mm and less are possible on the curves.

Figure 6:
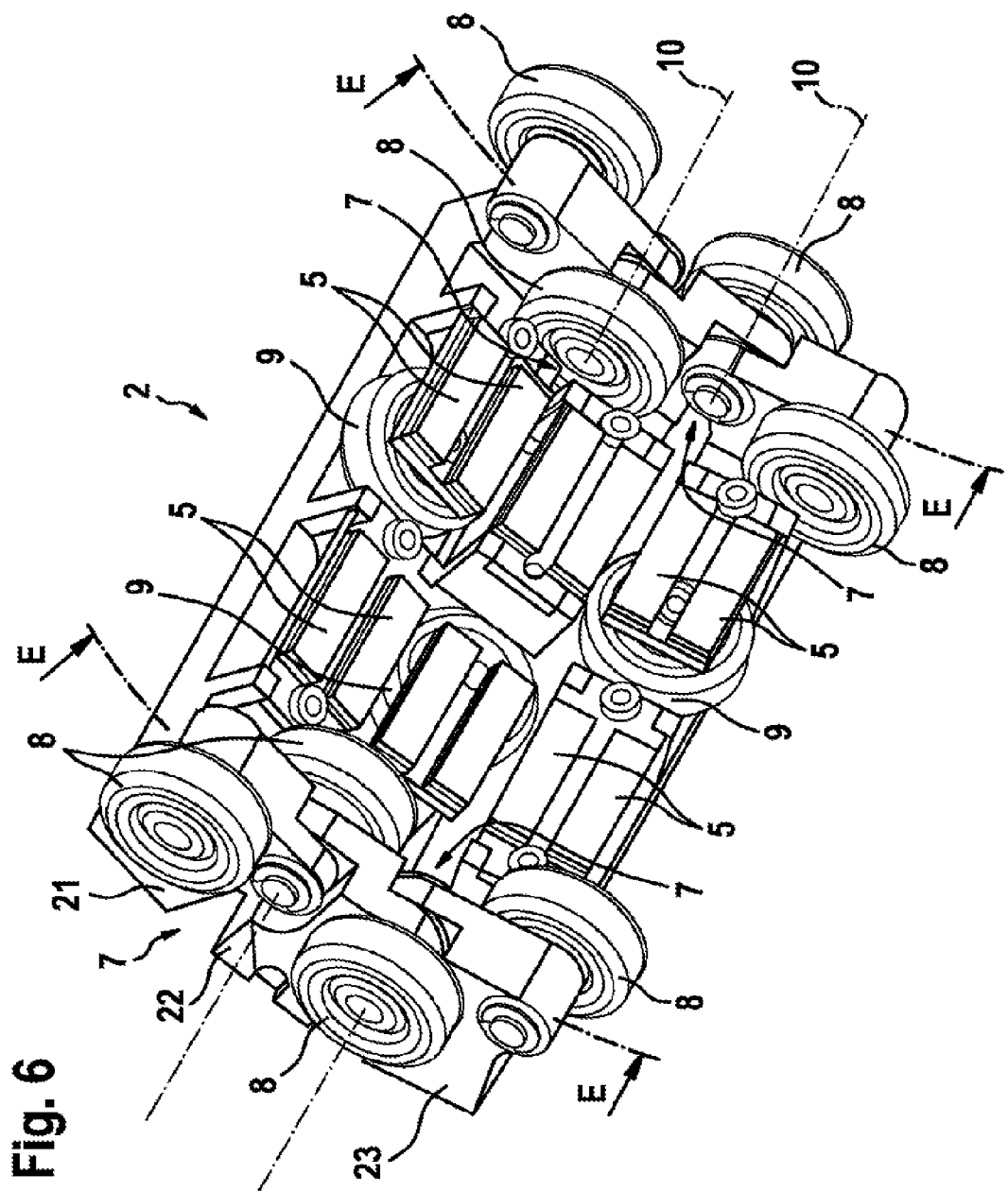
FIG. 6 shows a perspective representation of a conveying element according to a second exemplary embodiment of the invention.
Figure 7:
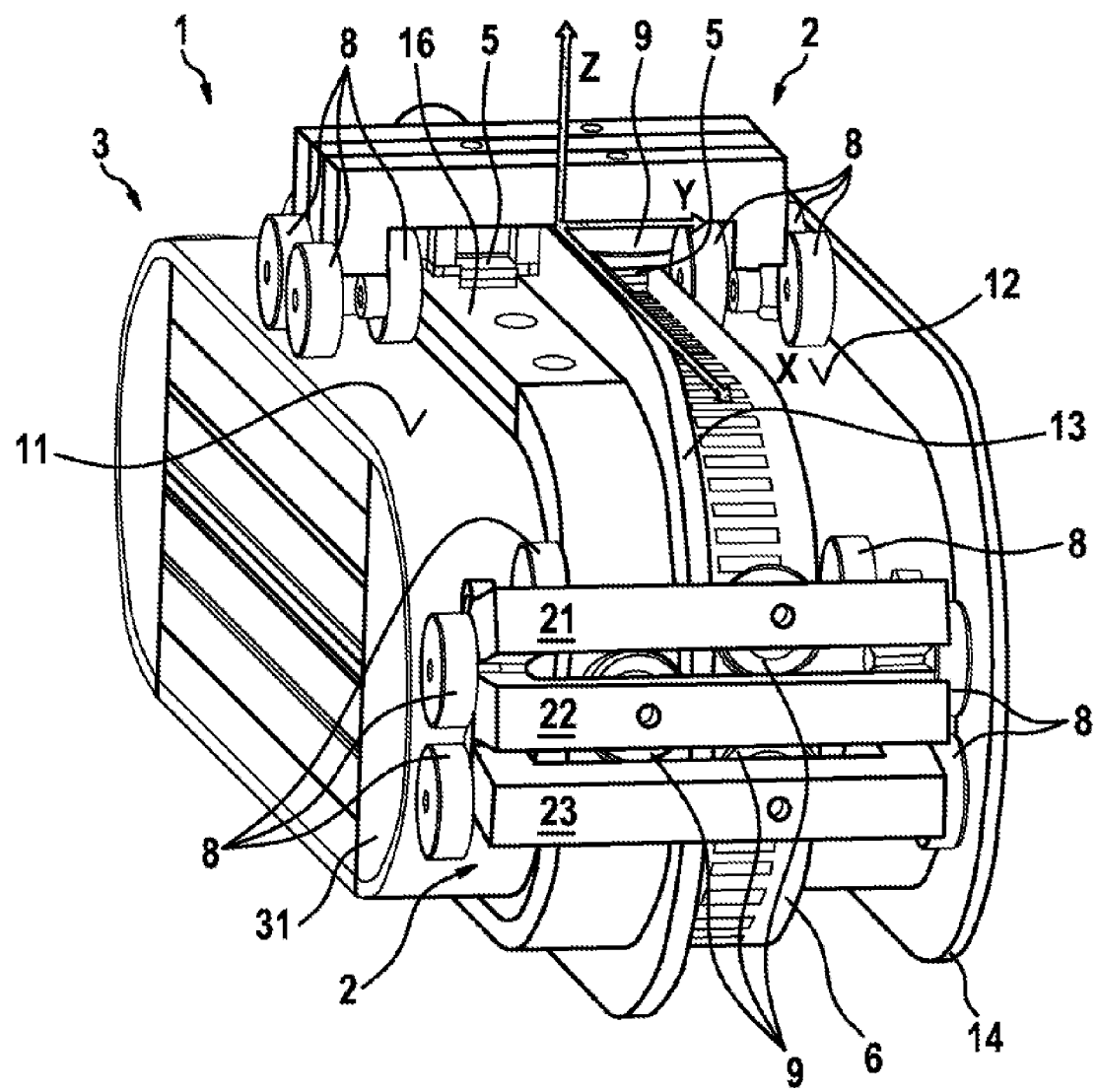
FIG. 7 shows a perspective representation of the conveying element of the second exemplary embodiment on a running rail.

FIGS. 6 and 7 show a transporting apparatus 1 according to a second exemplary embodiment of the invention, identical or functionally identical parts being designated with the identical references as in the first exemplary embodiment.

The second exemplary embodiment corresponds substantially to the first exemplary embodiment, the difference to the first exemplary embodiment being a third guide roller 9 also being provided additionally on the conveying element 2 (see FIG. 6). In this case the guide rollers 9 are arranged in such a manner that one guide roller is arranged on one side of the guide rail 13 and two guide rollers are arranged on the other side of the guide rail. This means that a more load-bearing center guiding can be made possible. In addition, the conveying element 2 of the second exemplary embodiment comprises four running rollers 8 per running roller group, in each case two running rollers 8 being arranged on both sides of a plane E in which the articulations 7 are located.

As can also be seen from FIG. 7, a steel rail 16 is additionally arranged on the running rail 3 extending around the periphery. The steel rail 16 is provided in order to enable amplification of the magnetic attractive force for the individual conveying elements 2. The steel rail 16, in this case, as can be seen from FIG. 7, is arranged on one side of the guide rail 13, the coils 6 of the linear motor driving device 4 being provided on the other side of the guide rail 13.

The running rail 3 is also designed in a modular manner and can be realized with an arbitrary length by providing a plurality of linear parts. In addition, curved parts with various radii can be provided in order, in this way, to meet the different demands which are preset by the transporting job.

Otherwise, this exemplary embodiment corresponds to the first exemplary embodiment such that reference can be made to the description given there.

What is claimed is:

1. A transporting apparatus for conveying a product, said transporting apparatus comprising:
    a plurality of conveying elements (2) for conveying products, said conveying elements being movable independently of one another,
    a fixed running rail (3) which is arranged in a peripheral manner and defines a running path for the conveying elements (2),
    a guide device with a guide rail (13) on the running rail and at least three guide elements (9) on each conveying element (2), wherein one guide element (9) is arranged on a first side of the guide rail (13) and two guide elements (9) are arranged on a second side of the guide rail, and
    a linear motor driving device (4) for driving the conveying elements (2),
    wherein each conveying element (2) has permanent magnets (5) which are in operative connection with coils (6) of the linear motor driving device (4),
    wherein each conveying element (2) has at least one first part element (22) and one second part element (23), which are connected to one another in an articulated manner by means of an articulation (7), and
    wherein at least one running roller (8) is arranged on each part element (21, 22, 23).

2. The transporting apparatus as claimed in claim 1, characterized in that the at least one running roller (8) is arranged in an articulated axis (10) of the articulation (7).

3. The transporting apparatus as claimed in claim 1, characterized in that each conveying element (2) has a first running roller group (81) and second running roller group (82), wherein the first running roller group (81) is arranged on a first side of the conveying element (2) and the second running roller group (82) is arranged on a second side of the conveying element.

4. The transporting apparatus as claimed in claim 1, characterized in that each conveying element has an uneven number of part elements.

5. The transporting apparatus as claimed in claim 4, characterized in that each conveying element has precisely three part elements.

6. The transporting apparatus as claimed in claim 4, characterized in that each conveying element has precisely five part elements.

7. The transporting apparatus as claimed in claim 1, characterized in that one guide element (9) is arranged on each part element (21, 22, 23).

8. The transporting apparatus as claimed in claim 1, characterized in that the permanent magnets on the conveying element (2) are realized in the form of a cuboid with corners and articulated axes (10) of the articulations (7) extend through at least one corner of the permanent magnets (5).

9. The transporting apparatus as claimed in claim 8, characterized in that the articulated axes (10) of the articulations (7) extend through two corners of the permanent magnets.

10. The transporting apparatus as claimed in claim 1, wherein each of the guide elements (9) is a roller.

11. A transporting apparatus for conveying a product, said transporting apparatus comprising:
    a plurality of conveying elements (2) for conveying products, said conveying elements being movable independently of one another,
    a fixed running rail (3) which is arranged in a peripheral manner and defines a running path for the conveying elements (2),
    a guide device with a guide rail (13) on the running rail and at least three guide elements (9) on each conveying element (2), wherein one guide element (9) is arranged on a first side of the guide rail (13) and two guide elements (9) are arranged on a second side of the guide rail, and
    a linear motor driving device (4) for driving the conveying elements (2),
    wherein each conveying element (2) has permanent magnets (5) which are in operative connection with coils (6) of the linear motor driving device (4),
    wherein each conveying element (2) has at least one first part element (22) and one second part element (23), which are connected to one another in an articulated manner by means of an articulation (7), and
    wherein at least one running roller (8) is arranged in an articulated axis (10) of the articulation (7).

12. The transporting apparatus as claimed in claim 11, wherein each conveying element (2) has a first running roller group (81) and second running roller group (82), wherein the first running roller group (81) is arranged on a first side of the conveying element (2) and the second running roller group (82) is arranged on a second side of the conveying element.

13. The transporting apparatus as claimed in claim 11, wherein each conveying element has an uneven number of part elements.

14. The transporting apparatus as claimed in claim 11, wherein one guide element (9) is arranged on each part element (21, 22, 23).

15. The transporting apparatus as claimed in claim 11, wherein each of the guide elements (9) is a roller.

16. A transporting apparatus for conveying a product, said transporting apparatus comprising:
    a plurality of conveying elements (2) for conveying products, said conveying elements being movable independently of one another,
    a fixed running rail (3) which is arranged in a peripheral manner and defines a running path for the conveying elements (2),
    a guide device with a guide rail (13) on the running rail and at least three guide elements (9) on each conveying element (2), wherein one guide element (9) is arranged on a first side of the guide rail (13) and two guide elements (9) are arranged on a second side of the guide rail, and
    a linear motor driving device (4) for driving the conveying elements (2),
    wherein each conveying element (2) has permanent magnets (5) which are in operative connection with coils (6) of the linear motor driving device (4),
    wherein each conveying element (2) has at least one first part element (22) and one second part element (23), which are connected to one another in an articulated manner by means of an articulation (7), and
    wherein each conveying element (2) has a first running roller group (81) and second running roller group (82), wherein the first running roller group (81) is arranged on a first side of the conveying element (2) and the second running roller group (82) is arranged on a second side of the conveying element.

17. The transporting apparatus as claimed in claim 16, wherein each conveying element has an uneven number of part elements.

18. The transporting apparatus as claimed in claim 17, wherein each conveying element has precisely three part elements.

19. The transporting apparatus as claimed in claim 16, wherein one guide element (9) is arranged on each part element (21, 22, 23).

20. The transporting apparatus as claimed in claim 16, wherein each of the guide elements (9) is a roller.

\* \* \* \* \*